Nov. 24, 1964 N. J. BURGER ETAL 3,158,735
WELDING PREHEATER
Filed April 29, 1963 2 Sheets-Sheet 1
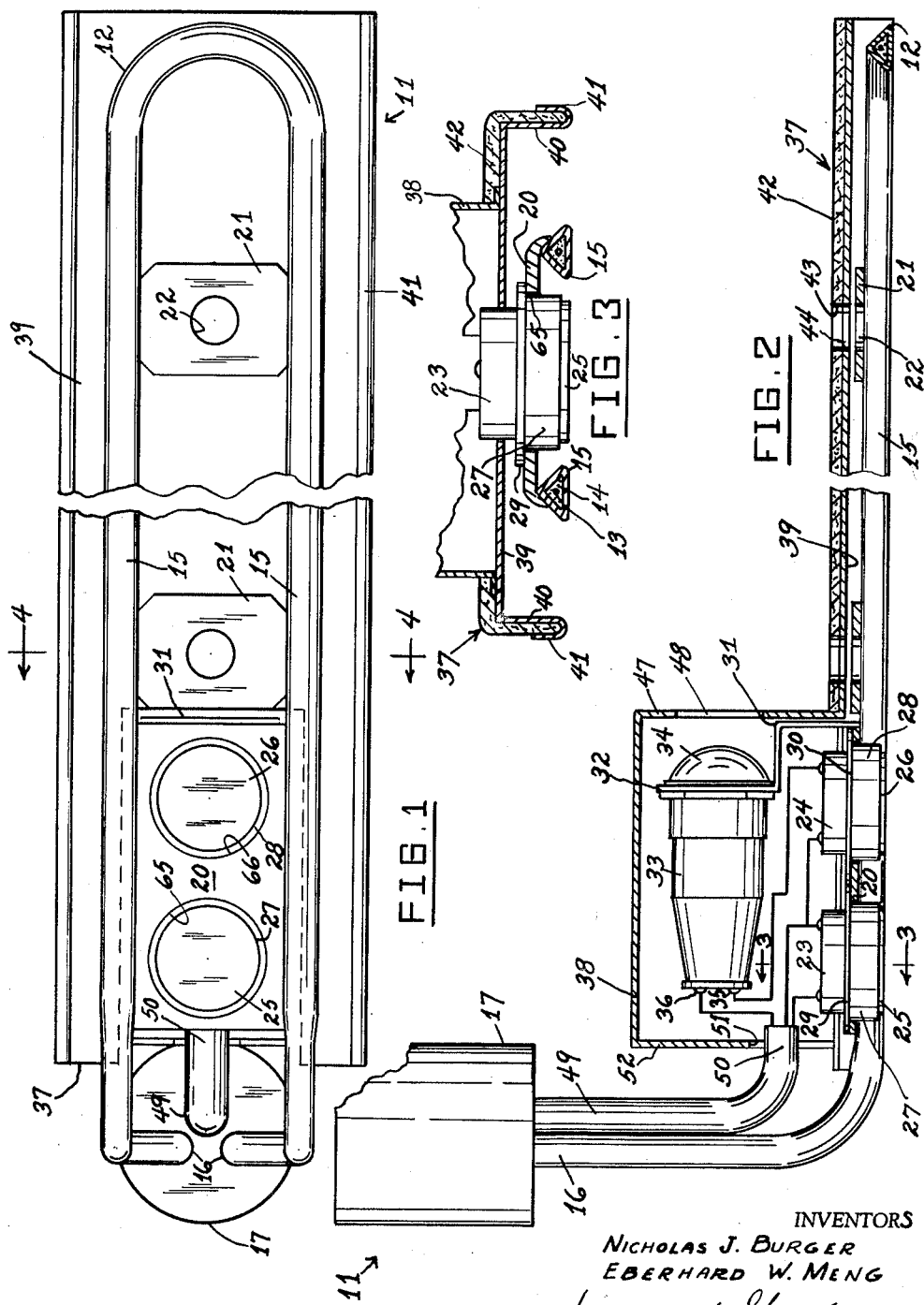
INVENTORS
NICHOLAS J. BURGER
EBERHARD W. MENG
BY Herman L. Gordon
ATTORNEY Nov. 24, 1964   N. J. BURGER ETAL   3,158,735
WELDING PREHEATER Filed April 29, 1963                                    2 Sheets-Sheet 2

INVENTORS
NICHOLAS J. BURGER
EBERHARD W. MENG

BY *Herman L. Gordon*

ATTORNEY

United States Patent Office 3,158,735
Patented Nov. 24, 1964

3,158,735
WELDING PREHEATER
Nicholas J. Burger, Silver Spring, Md., and Eberhard W. Meng, Washington, D.C., assignors to Electro-Therm, Inc., Laurel, Md.
Filed Apr. 29, 1963, Ser. No. 276,418
16 Claims. (Cl. 219—342)

This invention relates to heating devices, and more particularly to a heater for preheating plates that are to be welded.

In welding steel plates, for example, in shipbuilding, it is necessary prior to the actual welding operation to preheat the plates in the regions thereof to be welded because of the fact that at the high temperatures involved in the welding operation there is likely to occur various undesirable amounts of buckling and warping of the plates if they are welded without any preheating treatment. In the case of large plates, the only way to accomplish the desired preheating is to fasten the preheating apparatus directly to the plates and to transmit heat from the apparatus to the plates over a substantial period of time.

A main object of the invention is to provide a novel and improved welding preheater which is simple in construction, which is easy to mount, and which efficiently transfers heat to plates to be subsequently welded.

A further object of the invention is to provide an improved welding preheater which is inexpensive to fabricate, which is sturdy in construction, which is safe to handle, and which provides accurate indications of its operating conditions.

A still further object of the invention is to provide an improved electrically energized welding preheater which is thermostatically controlled so that it will deenergize its heating element if the temperature of the subjacent plate exceeds a predetermined upper limit and will reenergize the element when the temperature falls to a predetermined lower limit, the apparatus providing, after energization, a visual indication when the temperature of the subjacent plate rises to a value at least approximately equal to said lower limit value, the indication being maintained unless the temperature of the plate drops a predetermined amount below said lower limit value.

A still further object of the invention is to provide an improved welding preheater of the type which is fastened to plates to be preheated, the fastenings comprising studs secured to the plates, and the preheater being arranged so that a minimum number of studs are required to adequately secure the preheater to the plates to be preheated for welding.

Further objects and advantages of the invention will become apparent from the following description and claims, and from the accompanying drawings, wherein:

FIGURE 1 is a fragmentary bottom plan view of an improved welding preheater constructed in accordance with the present invention.

FIGURE 2 is a fragmentary longitudinal vertical cross-sectional view of the welding preheater of FIGURE 1.

FIGURE 3 is an enlarged transverse vertical cross-sectional view taken substantially on the line 3—3 of FIGURE 2.

Figure 4:
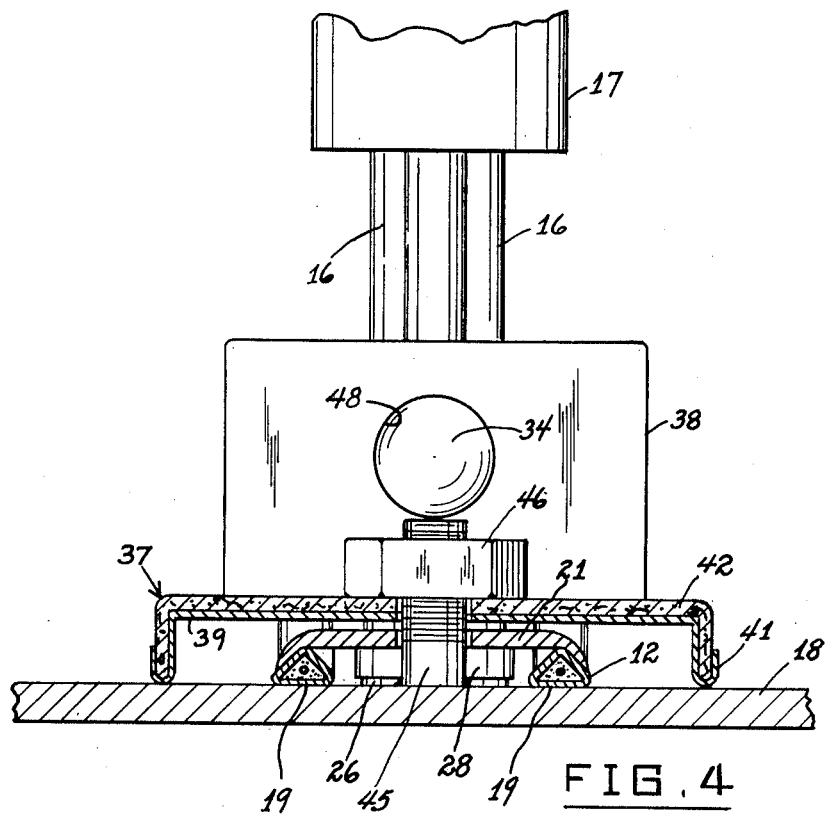
FIGURE 4 is an enlarged transverse vertical cross-sectional view taken substantially on the line 4—4 of FIGURE 1 and showing the preheater attached to a plate to be preheated for welding.

Referring to the drawings, 11 generally designates a typical welding preheater constructed in accordance with the present invention. The preheater 11 comprises a generally U-shaped heating element 12 of the type consisting of a metal tube containing a heating resistance winding 13 surrounded by tightly packed granular refractory material 14. The element 12 thus includes a pair of parallel horizontally spaced side arms 15, 15 of substantial length terminating in upstanding legs 16, 16 whose top ends are received in a conventional terminal box or housing 17 mounted on the legs, for housing the electrical power supply connections to the heater.

As shown in FIGURES 2, 3 and 4, the element 12 may be of generally triangular cross-section to present substantially flat heat-transmitting bottom surfaces 19, 19 to a subjacent plate 18 to be preheated, illustrated typically in FIGURE 4.

The parallel side arms 15, 15 are rigidly connected at spaced intervals therealong by transverse horizontal plate members 21, said plate members being provided with central apertures 22. The opposite ends of the plate members 21 are rigidly secured in any suitable manner to the arms 15, 15, for example, by brazing or welding.

A transverse horizontal plate member 20 is similarly rigidly secured to the side arms 15, 15 adjacent the upstanding legs 16, 16, and mounted in said plate member 20 are the respective longitudinally spaced flanged thermostatic switch units 23 and 24, said units being of the disc type and having flat bottom contact portions 25, 26 supported substantially coplanar with the bottom heat-transmitting surfaces 19, 19 of the element 12, namely, in positions to engage a plate 18 to be preheated for welding.

The plate member 20 is suitably apertured at 65, 66 to receive the circular depending main body portions 27 and 28 of the thermostatic switch units 23 and 24, the flanges 29 and 30 of said units being supported on and being secured to the top surface of the plate member 20.

Rigidly secured to the inner transverse edge of plate member 20 is an upstanding bracket 31 of generally Z-shape having a vertical upper arm 32 in which is secured a longitudinally extending lamp assembly 33 provided with the inwardly facing lens 34. Assembly 33 contains a suitable lamp socket in which is mounted an electric lamp located adjacent to and in a position to emit light through the lens 34 when energized. The lamp assembly 33 is provided with the power supply terminals 35 and 36.

Designated at 37 is a generally channel-shaped reflector and protective cover fitting over the heating element 12 and carrying a housing 38 adapted to overlie and cover the plate member 20 and the elements mounted thereon, namely, the thermostatic switch units 27 and 28 and the lamp assembly 33. The member 37 comprises a channel-shaped downwardly facing metal reflector 39 having depending longitudinal side arms 40, 40 formed with U-shaped, outwardly turned bottom flanges 41, 41. A relatively thick outer lamination 42 of heat-insulating material, such as asbestos composition, is secured on the metal reflector 39, the side edges of the lamination 42 being clampingly received in the U-shaped bottom edge flanges 41, 41 of the reflector side arms 40, 40, so that the lamination 42 is a unitary part of the cover 37. The insulating lamination 42 and the reflector 39 are formed with respective registering sets of apertures 43, 44 spaced to be vertically aligned with the apertures 22 of plate members 21 so as to receive upstanding anchoring studs 45 therethrough, as shown in FIGURE 4. The anchoring studs 45 are pre-welded to the plate 18 at locations to engage through the sets of registering apertures 22, 24, 43 of the preheater, whereby the preheater may be fastened to the plate 18 in a proper position to preheat the plate. Securement of the preheater is accomplished by threading clamping nuts 46 on the top ends of the studs 45 and tightening the nuts to exert downward clamping force on the cover 37.

The front wall of housing 38, shown at 47, is provided with a viewing window or aperture 48 adjacent and in front of the lens 34.

A wiring protective conduit 49 is secured to and depends from the terminal housing 17, said conduit 49 having a horizontal bottom end portion 50 extending through a bottom notch 51 provided in the rear wall 52 of housing 38. The conduit 49 is employed to house the wiring between the components in the housing 38 and the terminal housing 17.

Figure 5:
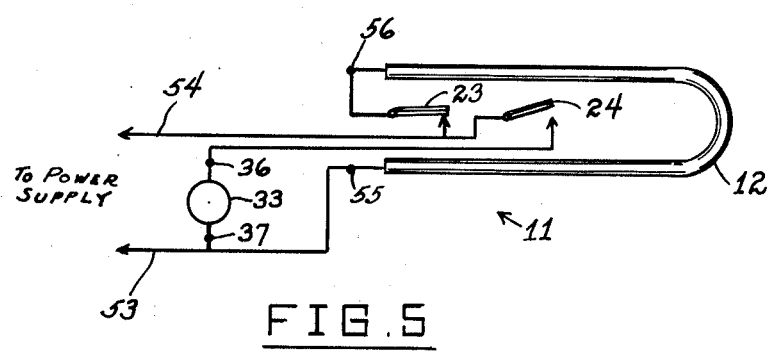
FIGURE 5 is a schematic wiring diagram showing the electrical connections of a typical welding preheater such as that illustrated in FIGURES 1 to 3.

As shown in FIGURE 5, the device 11 is energized from a pair of power supply conductors 53 and 54. Line conductor 53 is connected directly to one terminal 55 of the heating element 12. The remaining terminal 56 of the heating element is connected to the other line conductor 54 through the thermostatic switch unit 23. Switch unit 23 is set to open at a suitable upper temperature limit, for example, 250° F., and to close at a suitable lower limit, for example, 220° F.

One of the terminals 37 of the lamp assembly 33 is connected to the line conductor 53. The other terminal 36 is connected to line conductor 54 through the thermostatic switch assembly 24. Switch unit 24 is set to close at a predetermined temperature value at or near the lower limit of the desired preheat temperature range, for example, 220° F., and to open at a predetermined lower temperature, for example, 190° F.

Thus, when the line conductors 53 and 54 are connected to the power source, the heater element 12 will be energized, and when the plate 18 reaches the lower limit of the preheat range, namely, 220° F., in the typical arrangement above described, switch 24 closes and energizes the lamp of assembly 33. If the temperature of plate 18 rises above the desired upper limit, for example, 250° F., switch 23 opens and deenergizes the heater 12. Switch 24 remains closed. As the plate 18 cools, it reaches the lower preheat limit, namely, 220° F., and switch 23 again closes, causing the heater 12 to again become energized.

Lamp unit 33 remains energized as long as the temperature of plate 18 is at or above the lower preheat temperature limit. The deenergization of lamp unit 33 indicates that the plate 18 has either not reached the preheat temperature range, or that the power supply has either failed or has become disconnected from the supply conductors 53 and 54. Under normal conditons of operation, lamp unit 33 remains energized after the plate 18 has reached and is being maintained at a temperature above the minimum preheat temperature.

The thermostatic switch units 23 and 24 are preferably of the enclosed bimetal disc type.

While a specific embodiment of a welding preheater has been disclosed in the foregoing description, it will be understood that various modifications within the spirit of the invention will occur to those skilled in the art. Therefore it is intended that no limitations be placed on the invention except as defined by the scope of the appended claims.

What is claimed is:

1. A welding preheater comprising a generally U-shaped heating element having spaced side legs, a support plate secured at its opposite ends to said legs and extending transversely therebetween and parallel to the plane thereof, a thermostatic switch mounted on said support plate between said legs and having a temperature-sensing bottom surface portion substantially coplanar with the bottom plane of said legs and being engageable with a subjacent plate to be preheated, a pair of power supply conductors connected to said heating element through said thermostatic switch, a second thermostatic switch mounted on said support plate between said legs and having a temperature-sensing bottom surface portion substantially coplanar with said bottom plane, an electrical indicator mounted on said support plate, and means connecting said electrical indicator to said power supply conductors through said second thermostatic switch, said first switch being arranged to open at an upper temperature limit and to close at a lower temperature limit, said second switch being arranged to close substantially at said lower temperature limit and to open at a predetermined temperature lower than said lower temperature limit.

2. The structure of claim 1, and wherein said second thermostatic switch is adjacent to said first-named thermostatic switch.

3. In a welding preheater, a heating element having a pair of spaced leg portions, a plurality of spaced plate-like cross members rigidly secured at their ends to and connecting said leg portions, said cross members lying in planes extending parallel to the plane of said leg portions, at least one of said cross members being formed with an aperture adapted to receive on upstanding anchoring stud on a subjacent plate to be preheated, housing means positioned over and covering said heating element and being provided with an aperture adapted to receive said upstanding stud, and detachable means cooperable with the stud and preheater for clamping the preheater to the plate.

4. In a welding preheater, a heating element having a pair of spaced leg portions, at least one plate-like cross member rigidly secured at its opposite ends to and connecting said leg portions, said cross member extending parallel to the plane of said leg portions and being formed at its intermediate portion with an aperture adapted to receive an upstanding stud on a subjacent plate to be preheated, housing means positioned over and covering said heating element and being provided with an aperture adapted to receive said upstanding stud, and detachable means cooperable with the stud and preheater for clamping the preheater to the plate.

5. In a welding preheater, a heating element having a pair of spaced leg portions, at least one plate-like cross member rigidly secured at its opposite ends to and connecting said leg portions, said cross member extending parallel to the plane of said leg portions and being formed at its intermediate portion with an aperture adapted to receive an upstanding stud on a subjacent plate to be preheated, a generally channel-shaped reflector mounted over and covering said heating element and being provided with an aperture in its top wall adapted to receive said upstanding stud, and detachable means cooperable with the stud and preheater for clamping the preheater to the plate.

6. The structure of claim 5, and an exterior covering of heat-insulating material secured on said reflector.

7. In a welding preheater, an elongated generally U-shaped heating element having a pair of spaced leg portions, a plurality of spaced plate-like cross members rigidly secured at their opposite ends to and connecting said leg portions, said cross members extending parallel to the plane of said leg portions and being each formed between said leg portions with an aperture adapted to receive an upstanding anchoring stud on a subjacent plate to be preheated, housing means positioned over and covering said heating element and being provided with an aperture adapted to receive said upstanding stud, and detachable means cooperable with the studs and preheater for clamping the preheater to the plate.

8. In a welding preheater, an elongated generally U-shaped heating element having a pair of spaced leg portions, a plurality of spaced plate-like cross members rigidly secured at their opposite ends to and connecting said leg portions, said cross members extending parallel to the plane of said leg portions and being respectively formed with apertures between said leg portions adapted to receive upstanding anchoring studs on a subjacent plate to be preheated, a generally U-shaped reflector mounted over and covering said heating element and being provided with apertures to receive said anchoring studs, and detachable means cooperable with the studs and preheater for clamping the preheater to the plate.

9. In a welding preheater, an elongated generally U-shaped heating element having a pair of spaced leg portions, a plurality of longitudinally spaced plate-like cross members rigidly secured at their opposite ends to and connecting said leg portions, said cross members extending parallel to the plane of said leg portions and being respectively formed between said leg portions with apertures adapted to receive upstanding anchoring studs on a subjacent plate to be preheated, an elongated inverted channel-shaped reflector mounted over and covering said heating element and being provided with apertures to receive said anchoring studs, an exterior covering of heat-insulating material secured on said reflector, and detachable means cooperable with the studs and preheater for clamping the preheater to the plate.

10. In a welding preheater, an elongated generally U-shaped heating element having a pair of spaced side leg portions, a plurality of spaced plate-like cross members rigidly secured at their opposite ends to and connecting said leg portions, said cross members extending parallel to the plane of said leg portions and being respectively formed between said leg portions with apertures adapted to receive upstanding anchoring studs on a subjacent plate to be preheated, a plate member rigidly secured between said leg portions and extending parallel to the plane thereof, a thermostatic switch mounted on said plate member and having a temperature-sensing bottom surface portion substantially coplanar with the bottom plane of said leg portions, and detachable means cooperable with the studs and preheater for clamping the preheater to the plate.

11. In a welding preheater, an elongated generally U-shaped heating element having a pair of spaced side leg portions, a plurality of spaced plate-like cross members rigidly secured at their opposite ends to and connecting said leg portions, said cross members extending parallel to the plane of said leg portions and being formed between said leg portions with apertures adapted to receive upstanding anchoring studs on a subjacent plate to be preheated, a plate member rigidly secured between said leg portions and extending parallel to the plane thereof, a thermostatic switch mounted on said plate member and having a temperature-sensing bottom surface portion substantially coplanar with the bottom plane of said leg portions, a housing portion on said reflector overlying said thermostatic switch, and detachable means cooperable with the studs and preheater for clamping the preheater to the plate.

12. In a welding preheater, an elongated generally U-shaped heating element having a pair of spaced side leg portions, a plurality of spaced cross members secured to and connecting said leg portions, said cross members being formed between said leg portions with apertures adapted to receive upstanding anchoring studs on a plate to be preheated, a plate member rigidly secured between said leg portions, a thermostatic switch mounted on said plate member and having a depending temperature-sensing portion substantially coplanar with the bottom plane of said leg portions, a pair of supply conductors, means connecting said heating element to said supply conductors through said switch, a second thermostatic switch mounted on said plate member and having a depending temperature-sensing portion substantially in said bottom plane, an electrical indicator mounted on said plate member, and means connecting said electrical indicator to said supply conductors through said second thermostatic switch, said first switch being arranged to open at an upper temperature limit and to close at a lower temperature limit, said second switch being arranged to close substantially at said lower temperature limit and to open at a predetermined temperature lower than said lower temperature limit.

13. The structure of claim 12, and a housing portion on said heating element overlying said electrical indicator and thermostatic switches.

14. In a welding preheater, an elongated generally U-shaped heating element having a pair of spaced side leg portions, a plurality of spaced cross members secured to and connecting said leg portions, said cross members being formed between said leg portions with apertures adapted to receive upstanding studs on a plate to be preheated, a plate member rigidly secured between said leg portions, a thermostatic switch mounted on said plate member and having a depending temperature-sensing portion substantially coplanar with the bottom plane of said leg portions, a pair of supply conductors, means connecting said heating element to said supply conductors through said switch, a second thermostatic switch mounted on said plate member and having a depending temperature-sensing portion substantially in said bottom plane, an electrical indicator mounted on said plate member, means connecting said electrical indicator to said supply conductors through said second thermostatic switch, said first switch being arranged to open at an upper temperature limit and to close at a lower temperature limit, said second switch being arranged to close substantially at said lower temperature limit and to open at a predetermined temperature lower than said lower temperature limit, and an inverted generally channel-shaped reflector mounted over and covering said heating element and being provided with apertures to receive said studs.

15. The structure of claim 14, and a housing portion on said reflector overlying said electrical indicator and thermostatic switches.

16. The structure of claim 14, and an exterior covering of heat-insulating material secured on said reflector.

References Cited in the file of this patent

UNITED STATES PATENTS

| | | |
|---|---|---|
| 1,478,271 | Weiss | Dec. 18, 1923 |
| 1,926,075 | Watson | Sept. 12, 1933 |
| 2,425,271 | Tandler | Aug. 5, 1947 |
| 2,668,896 | Husaczka et al. | Feb. 9, 1954 |
| 2,877,332 | Senior | Mar. 10, 1959 |
| 3,045,098 | Norton | July 17, 1962 |
| 3,070,684 | Turner | Dec. 25, 1962 |